Jan. 20, 1970 K. OROSZY 3,491,210

TIME MULTIPLEX COMMUNICATION EXCHANGE SYSTEM, WITH PROVISION FOR BREAK-IN ON EXISTING CONNECTIONS

Filed Sept. 3, 1965 3 Sheets-Sheet 1

United States Patent Office 3,491,210

Patented Jan. 20, 1970

3,491,210

TIME MULTIPLEX COMMUNICATION EXCHANGE SYSTEM, WITH PROVISION FOR BREAK-IN ON EXISTING CONNECTIONS

Karlheinz Oroszy, Munich, Germany, assignor to Siemens Aktiengesellschaft, Munich, Germany Filed Sept. 3, 1965, Ser. No. 484,971

Claims priority, application Germany, Sept. 15, 1964, S 93,155

Int. Cl. H04m 3/00

U.S. Cl. 179—18 4 Claims

ABSTRACT OF THE DISCLOSURE

In a TDM system, a third subscriber station may break in on an existing connection between calling and called stations. Speaking registers associated with the respective stations are connected to a multiplex line in a first time slot occupied by the calling and called stations. A different time slot is assigned to the third station, and the speaking registers associated respectively with the third station and with the called or the calling station are cyclically connected throughout said different time slot.

Applicant claims priority from corresponding German application Ser. No. S 93,155, filed Sept. 15, 1964.

GENERAL DESCRIPTION

This invention relates to an exchange system operating in accordance with the time multiplex principle, wherein the speaking energy registers of calling speaking stations are connected with a speaking multiplex line in a first time slot assigned to the calling speaking station, for the exchange of speaking energy over switches, and further wherein a third station desires to be connected into the existing connection. That is, the invention is intended for use when a so-called break-in facility is provided. In accordance with the invention, with a minimum of additional equipment, the station which breaks into the existing connection is connected to the speaking energy register in the time slot assigned to the breaking-in station, and energy is picked up by the breaking-in station in the new time slot, even though the speaking energy is exchanged between the stations of the original connection in a different pulse phase.

More particularly, the system of the invention provides a busy signal in the event that a third station makes a call to a station participating in an existing connection. This busy signal is picked up in an auxiliary register in a second time slot, different from the time slot of the existing connection, and the break-in signal emitted by the third speaking station is picked up in a register in this same second time slot. These two signals are joined into a combination signal, through a central control apparatus which provides the combination signal, which causes connection of the speaking energy register associated with the busy speaking station, over a switch, with the speaking multiplex line in the second time slot. The result is that the speaking energy registers of the speaking stations participating in the already existing connection exchange the speaking energy, in the first time slot, and the speaking energy register of the called, busy speaking station of the existing connection, and the speaking energy register of the breaking-in speaking station exchange the speaking energy picked up, in the second time slot.

With the apparatus of the invention, the apparatus requirements for the breaking of a speaking station into an existing connection are considerably decreased, by using the available speaking energy registers assigned to the stations already connected, additionally for the interchange of speaking energy between the breaking-in speaking station and the speaking stations of the existing connection. The equipment already available for standard connection establishment, such as the address register, the delay line storage devices, decoder, and the speaking switches are therefore shared and utilized together for the additional function of controlling the speaking switches and energy registers assigned to the speaking station in the additional break-in connection. Therefore, to carry out the breaking-in operation it is only necessary to provide for the picking up and evaluation of the break-in signal. Depending on the registry capacity of the speaking energy registers, several connection stations can participate in this manner in an existing connection, such as through a conference connection.

STATE OF THE PRIOR ART

In known exchange systems operating in accordance with the time multiplex principle, the individual time slots are either individually assigned to the speaking stations, or the time slots are assigned to the established connections. For exchange systems operating in accordance with this principle, there are known circuit arrangements wherein the speaking stations of several groups can be connected with one another with individual speaking multiplex lines, by means of speaking energy registers. In each case, the speaking energy registers pick up temporarily the speaking energy which is to be exchanged by the stations participating in a connection. If the stations participating in a connection are connected to the speaking multiplex line of their group at different times, the time interval which passes between the times of connection by the speaking switches of the stations to the multiplex line is bridged over with the aid of these speaking energy registers. In systems of this type, the speaking energy registers operate in such a way that they are connected to the multiplex line in the time slot of the one connection, as well as in the slot of the other connection. In this known technique these speaking energy registers are always special registers not individually assigned to the speaking stations. The connection of these registers over corresponding speaking switches to the multiplex line requires a special address generator for the registers, and accordingly also a delay line storage device and a decoder for access to the speaking switches assigned to the register, for connection of the register to the multiplex line in the corresponding time slots.

It is evident from the preceding description that in the technique described extra items of equipment are necessary to carry out a speaking energy exchange in different time slots. The apparatus of FIG. 1A so shows an arrangement of this type and illustrates the operation together of the individual elements. The elements of FIG. 1A will not be described in detail, because they have been previously described in such applications as Kneisel and Honold applications Ser. Nos. 390,026 and 390,027, (now Patent Nos. 3,366,741 and 3,366,742); and Darre, Kneisel and Honold application Ser. No. 390,143, (now Patent No. 3,366,743) all filed Aug. 17, 1964, and all assigned to the assignee of the present application.

In operation of apparatus including that shown in FIG. 1A, upon demand for a free speaking energy register, the address of this register is transmitted from address generator AS for such registers, over switch D1, to delay line storage device Us. The address of the free speaking energy register picked up in this storage device Us, with the time slot assigned to the first speaking station, and also in the time slot of the second speaking station, controls, for example, switch SE1, to close these two switches in each of these two time slots. Consequently, the speaking energy from the first speaking station is picked up in the speaking energy register associated with switch SE1, in the first time slot P1, and that energy is then transmitted to the second speaking station in the second time slot P2. If such a technique is used in conjunction with a breaking-in facility, in which a subscriber is added to an existing connection, then the time slot assigned to the breaking-in speaking station, for example P3, is known from the beginning, but the time slot (for example P1) of the station which was called by the breaking-in station and found busy, which slot is used in the existing connection, is missing. This time slot has to be ascertained, but such ascertainment requires additional facilities. If such facilities are to be provided, then in the special speaking energy register associated with switch SE1, the speaking energy of the existing connection is picked up in the time slot P1 and transmitted in the time slot P3 to the breaking-in speaking station.

In contrast to the systems of the prior art, the task of the present invention is to simplify the switching of a speaking station into an existing connection and to decrease the expense thereof, in an exchange system operating in accordance with the time multiplex principle.

DESCRIPTION OF THE INVENTION

The invention will now be more fully described in conjunction with an operative embodiment thereof shown in the accompanying drawings.

Figure 1:
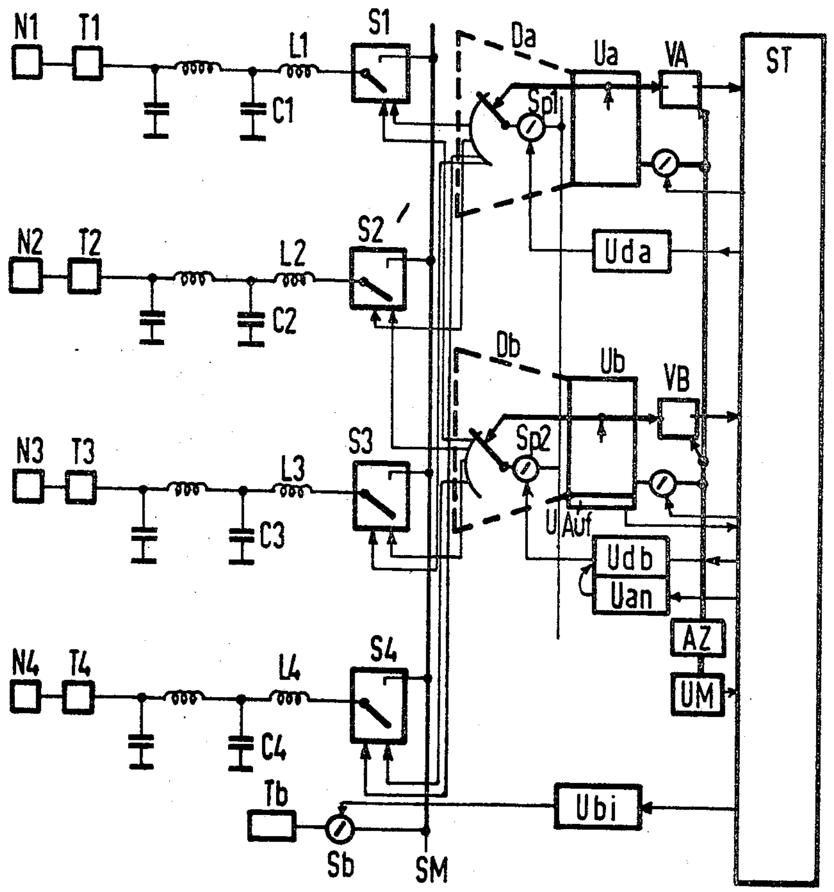
FIG. 1 is a partially schematic block diagram showing one embodiment of the invention.
Figure 1A:
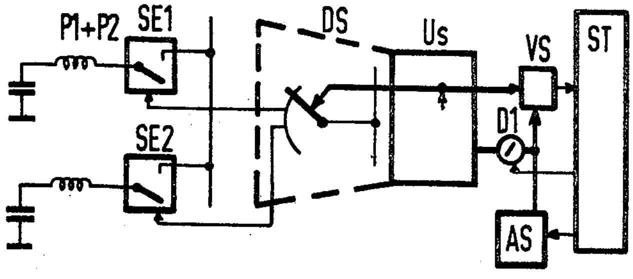
FIG. 1A is a partially schematic block diagram of portions of a prior art apparatus providing for connection to special speaking energy registers, in a time multiplex communication system.

In the apparatus of FIG. 1, the speaking stations N1 to N4 are connected to a speaking multiplex line SM, by respective speaking switches S1 to S4. The control of the connection of the energy registers through the speaking switches to the multiplex line takes place by means of a delay line storage device U*a*, or U*b*, together with respective decoders D*a* and D*b*. In order that the stations may participate in a connection, the corresponding speaking switches are actuated in the time slot assigned to the connection, or to the calling speaking station. For actuation of the connection, or for the change of the existing connection, a central control apparatus ST is provided. The through connection of a speaking switch depends upon operation of a blocking switch (S*p*1, S*p*2) assigned to the decoder which is controlled in the time slot assigned to the connection, in an auxiliary register (U*da*, U*db*).

A short description of the operation of the time multiplex system will now be given. It will be assumed that the controlling operations in the arrangement shown in the drawings take place in dependence upon the information at the output of the address generator AZ, in respective information and operating cycles. If, for example, the shown apparatus is intended to function with a many as 1,000 subscribers for each group associated with a multiplex line, and the scanning period requires that 100 microseconds be used in scanning for each speaking station, then at least 100 milliseconds are required to cover all of the 1,000 subscribers' addresses, even if only the information cycles occur. If an operating cycle follows an information cycle, then each step in the scanning cycle is prolonged by an additional 100 microseconds for each address for which an operating cycle is necessary.

As a result of this operation, during the 100 millisecond cycle of the address generator, each of the 1,000 addresses is present for at least 100 microseconds at the output of the address generator. During this time period of 100 microseconds, a check is made to determine whether a change has occurred in any of the available 100 time slots, for this particular address, as compared with the last scanning cycle of the address generator. In case there has been a change, appropriate information is provided to the central control apparatus and orders are emitted therefrom in the immediately succeeding operating cycle. These 100 time slots during each scanning position, each of one microsecond, are partially used for assignment to connections, or to calling speaking stations (for example, from time slot 1 to time slot 94), and partially for the controlling function (for example, from P95 to P0).

Figure 2:
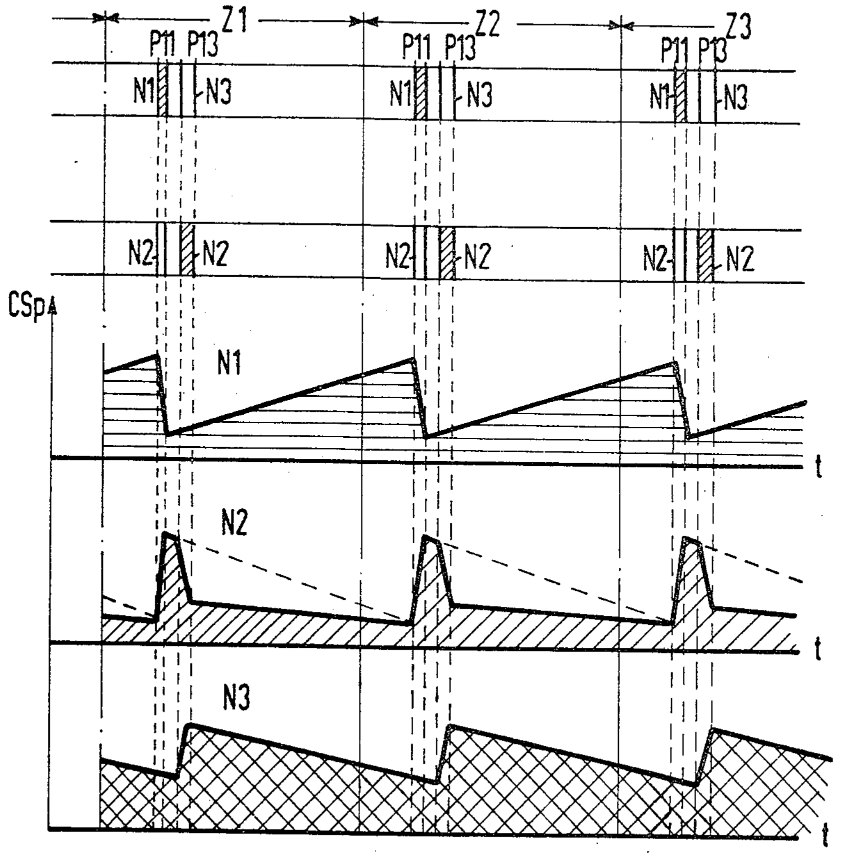
FIG. 2 is a graphical showing of the transfer of speaking energy between the several stations involved when a break-in facility is provided; and, FIG. 3 is a further graphical showing of the operation of speaking energy exchange, but when the time slot assigned to the breaking-in station is far removed from the time slot of the existing connection.
Figure 3:
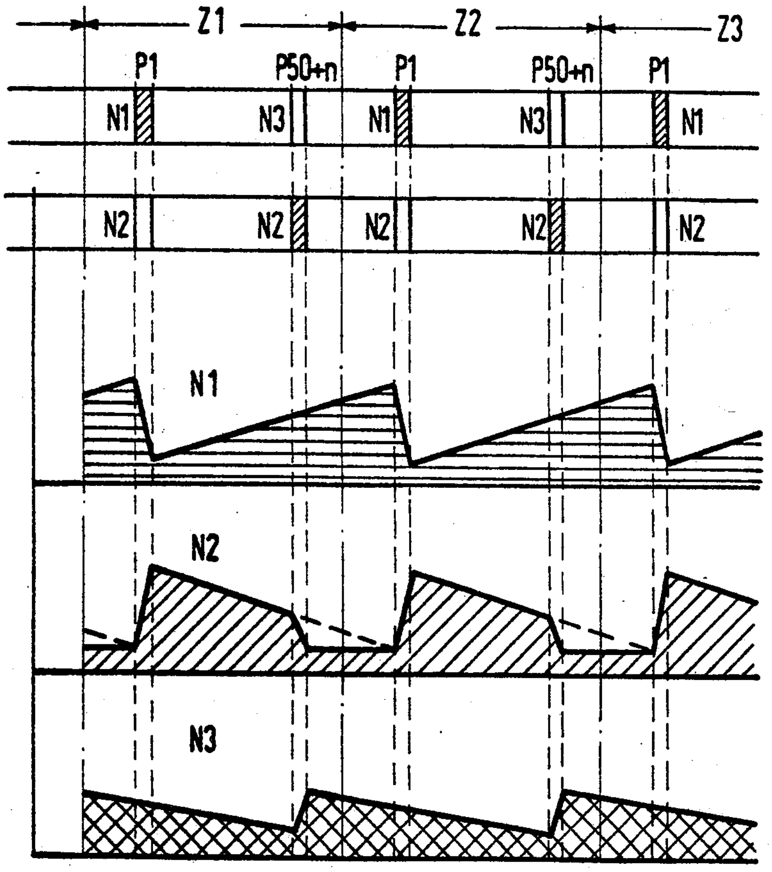

In the arrangement of the invention, the speaking energy is transmitted in the form of voltage charges onto the capacitors of the speaking energy register assigned to a speaking station, and is not only utilized for the existing connection, but is also employed for the break-in connection. These voltage charges, which leak off slowly over parallel connected transformers or inductors, and resistors, still remain large enough during the complete cycle of 100 microseconds, that satisfactory communication between a breaking-in station and a speaking station participating in the existing connection is possible. However, the greater the time interval between the two phases within a 100 millisecond cycle, naturally the higher the damping of the speaking energy, as a result of the continued discharge of the condensers. FIGS. 2 and 3 are intended to illustrate, however, that during the break-in connection, sufficiently high voltages still exist to make possible satisfactory communication, throughout the entire range of slots P1 to P94.

Referring back to FIG. 1, it will be assumed that the subscriber of speaking station N1 has lifted the receiver at his station and has been assigned the time slot P11 by operation of the control apparatus ST. Upon assignment of this free time slot P11, the address of the station N1 is picked up in delay line storage device U*a* in that time slot, in a manner not shown, so that such delay line storage device can operate the speaking switch S1 of the station N1, over a decoder D*a*. In a manner explained in the above-referred to applications, the operation of the speaking switch S1 to close connection between the multiplex highway SM and the station N1, takes place by operation of a pulse picked up in time slot P11 in the auxiliary delay line storage device U*da*, by virtue of operation of blocking switch S*p*1.

The dial signals dialed by the subscriber at speaking station N1 are picked up in a digit receiver (not shown) and are transmitted over this digit reciver to the delay line storage device U*b*, in time slot P11. A comparator VB then compares the address of the desired speaking station with the outputs of each of the delay line storages U*a* and U*b*, in each of the time slots P1 to P94, in order to ascertain whether the address of the desired speaking station is already in those registers, indicating that such station is taking part in an existing connection. If the called speaking station is free, then the output of the comparator VB is such that the central control apparatus ST provides a control pulse to the delay line storage device U*db*, so that the blocking switch S*p*2 is actuated and the speaking switch S2 is then operated by the decoder D*b*. As a result, the speaking switches S1 and S2 are actuated in time slot P11, by way of decoders D*a* and D*b*, so that the speaking energy picked up in the registers C1 and C2 corresponding to the speaking stations N1 and N2 participating in the connection is exchanged in time slot P11 over the speaking multiplex line SM.

If, additionally, the subscriber of speaking station N3 desires to break into this existing connection, a free time slot is assigned to it (for example P13), and the address of station N3 is picked up in delay line storage device Ua in that slot. Speaking station N3 therefore is connected to the multiplex line over the speaking switch S3, through operation of decoder Da, in slot P13. Now, if the subscriber at station N3 dials the address of the station N2 which is participating in the existing connection, the address of this speaking station is transferred to the delay line storage device Ub, over the digit reciver, not shown. The comparator VB provides an output at the time that the address generator AZ has present at its output the address of the desired station N2, indicating that the station N2 is already taking part in a connection. The central control apparatus thereby recognizes at time slot P11 (the slot of the existing connection) that station N2 is requested by station N3, but is also taking part in the existing connection. In the same information cycle in which this information is transmitted to the control apparatus, the address of the called station N2 is also transmitted to the control apparatus ST in time slot P13, because that address is present in this slot in the delay line storage device Ub. The coincidence between these two items of information in the control apparatus is indicated and provides the information that the desired speaking station is busy. The central control apparatus ST, therefore, transmits a pulse to the auxiliary delay line storage device Ubi, in the time slot P13, this being a storage device for busy time slots. The output of the delay line storage device Ubi controls the switch Sb and operates it at slot P13, so that a busy signal is switched on to the speaking multiplex line SM in the slot P13, by the sound generator Tb. The speaking station M3 therefore receives a busy signal in the time slot assigned to it.

Additionally, if the subscriber at the speaking station M3 had dialed or does dial a break-in signal, then such signal is provided in the time slot P13, over the digit receiver, to a special auxiliary delay line storage device UAuf (break-in). This special storage device is linked to the delay line storage device Ub in appropriate form. This signal in time slot P13 may be picked up from such as a circulating wire type of storage device and transmitted to the central control apparatus ST. Then, coincidence between this information and time slot P13 and the information that breaking-in is authorized for the calling station N3, received from register UM, is indicated in the control apparatus ST. The register UM provides at its output the address then being provided by address generator AZ in the event that the particular station whose address is then at the output of the address generator is authorized to break into an existing connection.

A coincidence is then indicated in the central control apparatus between the address of the breaking-in station N3 at the output of address generator AZ, the output of the register UM, the busy signal, the address of the break-in station at the output of delay line storage device Ub, and the presence of the special signal from station N3 indicating a desire to break in. This coincidence of signals causes an output to be provided by the central control apparatus ST in time slot P13, which output is transmitted in the operating cycle following the information cycle, to the auxiliary delay line storage device Udb.

It is also possible to test and temporarily register the authorization of the desired busy station, upon the address of that station being present at the output of the address generator, so as to determine whether breaking-in is authorized. If this testing is not required, a pulse is provided to the delay line storage device Udb in time slot P13 during the operating cycle after ascertainment of the break-in authorization, and upon the address of the breaking-in speaking station being present at the output of address generator AZ. Otherwise, this operation takes place only after 100 milliseconds in the succeeding time slot cycle, that is, after the further information is obtained.

In this fashion the blocking switch Sp2 is also actuated in time slot P13, so that speaking station N2 is connected not only with the time slot P11, but also with the time slot P13 to the multiplex line SM. The speaking energy registered in the pulse phase P11 in the register C2 is then transmitted in slot P13 to the register C3 of station N3. On the other hand, the energy present in register C3 can also be transmitted in slot P13 to the speaking energy register C2, over the switch S3 and the switch S1 so that in the succeeding cycle of the register C2, this energy is provided to the register C1 in slot P11. In such fashion the speaking energy of stations N1, N2 and N3 are interchanged.

With the help of the showing of FIG. 2 the relative voltage proportions which are transferred during the break-in connection can be described. It will be seen that the horizontal in the graphic showing of FIG. 2 indicates time and that each one of the time slots in a cycle Z1, Z2, Z3 . . . is indicated by a slice, such as P11, P13, in the top two lines of indication. The bottom three shaded and cross-hatched graphical presentations indicate the voltage levels at the outputs of the speaking energy registers associated with the stations N1, N2 and N3, respectively. It will be seen from these diagrams that speaking station N1 has established a connection with station N2 in time slot P11, and that station N3 desires a connection to the station N2 in slot P13. Further, it is presumed that the subscriber of speaking station N1 is speaking, so that the energy from the station N1 is as shown in the first or uppermost of the three voltage curves.

This energy builds up in the register C1 to a maximum at slot P11, when a portion thereof is transmitted to energy register C2 of station N2, over the multiplex line SM. The energy in register C1 therefore first decreases very sharply during the interval P11 and then increases slowly during the interval from that time slot until a new slot P11 arrives in the second cycle Z2.

Referring to the second voltage diagram, it is seen that the energy stored in the register C2 associated with station N2 decreases slowly until the time slot P11 is reached, whereupon it increases suddenly to a peak. Then it begins to drop off, but at time slot P13, the station N2 is connected to the station N3, so that the stored energy drops off rapidly. Then the energy in the register C2 again decreases slowly. It will be evident that the dashed lines associated with the second voltage diagram correspond to the slow drop off that would occur if there were no connection with the third speaking station.

Referring to the third voltage diagram, the energy in the register C3 decreases slowly until time slot P13 is reached, whereupon it increases sharply in correspondence with the decrease in the register C2 associated with station N2. Then, the energy in the register C3 decreases slowly until the time slot P13 is reached in the next cycle.

It is evident also from FIG. 2 that these sequences repeat successive other in each cycles.

It will further be evident from the diagrams that the speaking energy which is lost during the interval between the time slots P11 and P13, by reason of the slow decay in the stored energy, is relatively small.

The diagram of FIG. 3 indicates the maximum possible separation between the time slots assigned to the existing connection and that assigned to the added-on station. In FIG. 3 it is evident that the stations N1 and N2 are connected together in slot P1, while station N3 is breaks-in in slot P50+$n$, indicating the maximum separation possible between the two time slots. It will further be evident, particularly from the second voltage diagram showing the energy stored in the register C2 associated with station N2, that the voltage level is reduced to a lower level at the time the break-in station N3 is connected to the register C2, than it was in the comparable circumstances when the two time slots were very close to each other. Nevertheless, the decay is so slow that an appreciable amount of energy is still transferred to the station N3 in this later slot P50+n, so that the subscriber of station N3 can still listen in to the existing connection and receive adequate speaking energy. From actual experience it can be said that the loss through decay in the instance illustrated in FIG. 3 is not more than 8 dbs.

It need not be illustrated how the transfer of energy woud take place if one of the other speaking stations, such as that at N3, was receiving voice energy from the subscriber, since such operation is immediately evident from the showings of FIGS. 2 and 3.

The cancellation of the break-in connection can take place in a different manner. If the subscriber of the station N3 which brought about the break-in condition, cancels the connection (for example, by replacing the receiver), the time slot P13 is released and the original connection between the stations N1 and N2 continues to exist in slot P11. On the other hand, if the subscriber of station N1 releases the connection, there exists only the connection in slot P13 between the stations N3 and N1. If the subscriber of station N1 releases a connection through replacing the receiver, then there also exists no connection between stations N3 and N2. In a manner not shown, a busy signal can be transmitted to the speaking stations.

It will be evident that the particular apparatus shown is not essential to the operation of the invention. Indeed, the central control apparatus has not been at all shown in any detail, since it may contain the usual logic circuits of the type illustrated in the aforementioned copending applications, such as the logical AND's and delay circuits evidently necessary to provide the control signals indicated above, upon coincidence of the several signals referred to. Accordingly, the invention is not to be considered limited to the embodiments shown and described hereinabove, but rather only by the scope of the appended claims.

I claim:

1. In a method of permitting a third subsscriber speaking station to break into an existing connection between a calling speaking station and a called speaking station, in a time multiplex telephone system in which speaking registers are associated with the respective speaking stations and are connected to a multiplex line in a first time slot in which the calling and called stations are communicating, wherein the improvement comprises, assigning a different time slot to the third subscriber station and cyclically connecting the speaking register associated with the third speaking station and the speaking register associated with one of said calling and called speaking stations to the multiplex line throughout said different time slot.

2. The method of claim 1 including the step prerequisite to said connecting step of sensing the busy condition of the station called by said third station due to said existing connection and the coincidence therewith of authorization for the break-in connection.

3. The method of claim 2 in which the first time slot is assigned to the calling station, and said connecting step is taken if the third station calls that calling station.

4. The method of claim 3 including the step of supplying a busy signal to the multiplex line and connecting said third station thereto in said different time slot in the event the station called by the third station is taking part in an existing connection, and completing said connecting step only in the event the third station emits a special break-in signal.

References Cited

UNITED STATES PATENTS

| | | | |
|---|---|---|---|
| 2,552,799 | 5/1951 | Lomax | 179—18 |
| 2,917,583 | 12/1959 | Burton et al. | 179—18 |
| 3,127,478 | 3/1964 | Brouwer | 179—18 |
| 3,144,517 | 8/1964 | Albrecht | 179—18 |
| 3,274,342 | 9/1966 | Brightman | 179—18 |
| 3,319,005 | 5/1967 | Gaunt | 179—18 |

KATHLEEN H. CLAFFY, Primary Examiner
THOMAS W. BROWN, Assistant Examiner